Jan. 20, 1959 R. B. HAMMER 2,869,424
REFLECTIVE WARNING DEVICE
Filed Feb. 24, 1956 2 Sheets-Sheet 1

Inventor
Richard B. Hammer by Parker & Carter
Attorneys

Jan. 20, 1959 — R. B. HAMMER — 2,869,424
REFLECTIVE WARNING DEVICE
Filed Feb. 24, 1956 — 2 Sheets-Sheet 2
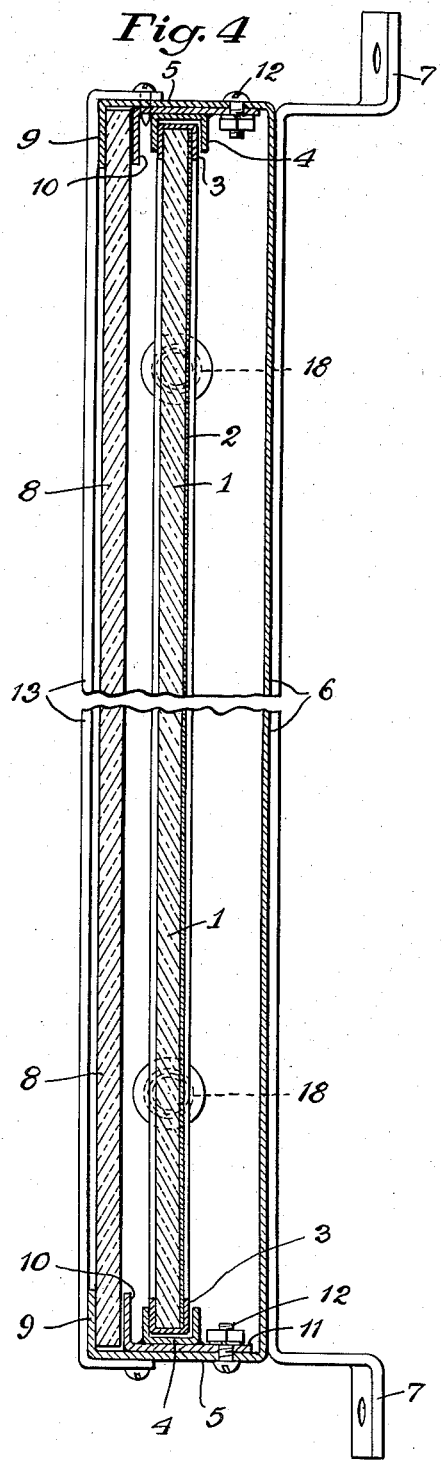
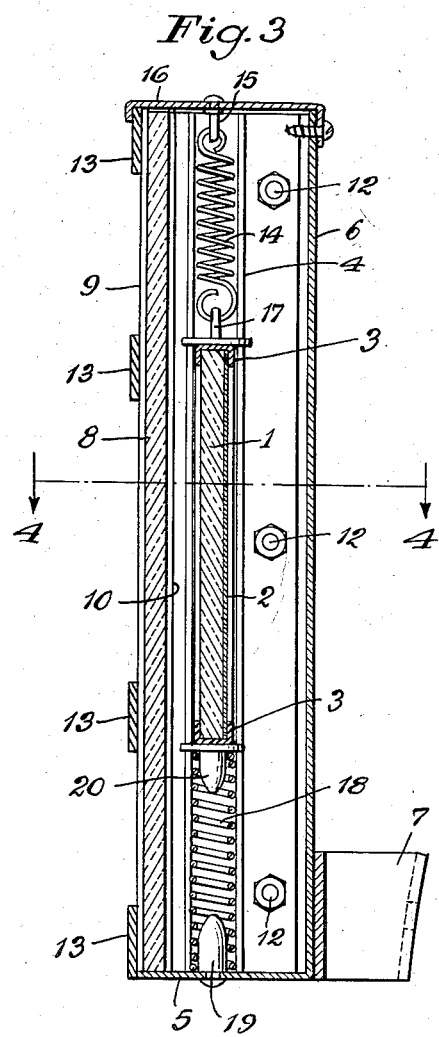
Inventor
Richard B. Hammer
by Parker & Carter
Attorneys

2,869,424
REFLECTIVE WARNING DEVICE

Richard B. Hammer, Chicago, Ill.

Application February 24, 1956, Serial No. 567,513

4 Claims. (Cl. 88—81)

This invention relates to a safety device or warning signal and it has for one object to provide a visual warning signal which may be positioned upon an automobile or other moving vehicle.

Another object is to provide a visual means which will have motion imparted to it from the motion of the vehicle which carries it.

Another object is to provide a reflective warning device which will reflect light from the headlights of an approaching vehicle and which will give a moving, vibrating, flashing or fluctuating reflected light as a result of the movement of the vehicle upon which it is mounted.

Other objects will appear from time to time throughout the specification and claims.

The invention is illustrated more or less diagrammatically in the accompanying drawings wherein:

Fig. 3 is a transverse vertical section taken at line 3—3 of Fig. 2 on a further enlarged scale;

Fig. 4 is a longitudinal transverse section taken at line 4—4 of Fig. 3.

Like parts are designated by like characters throughout the specification and drawings.

Figure 1:
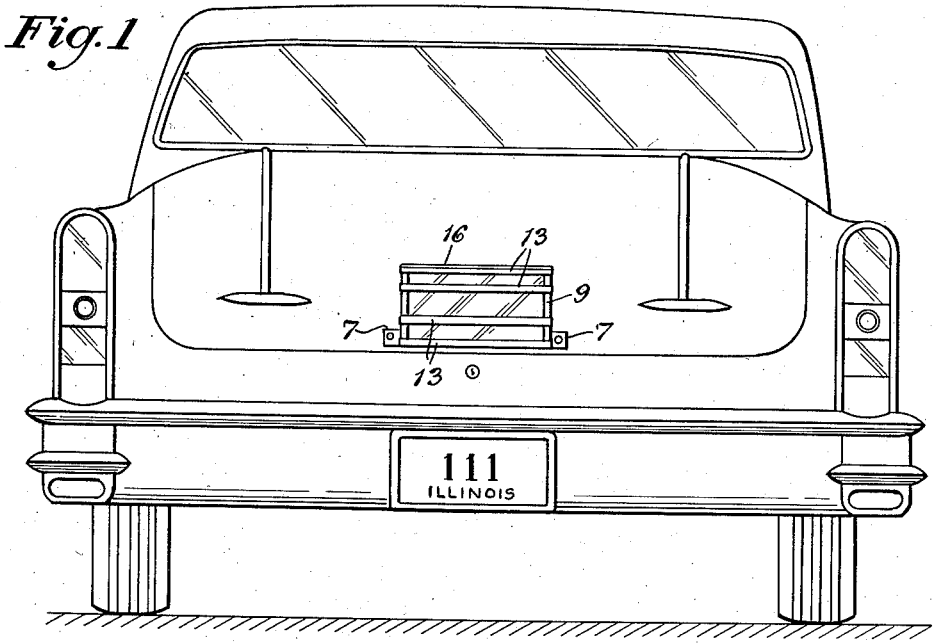
Fig. 1 is a rear view of an automobile upon which one form of the device of this invention is mounted.
Figure 2:
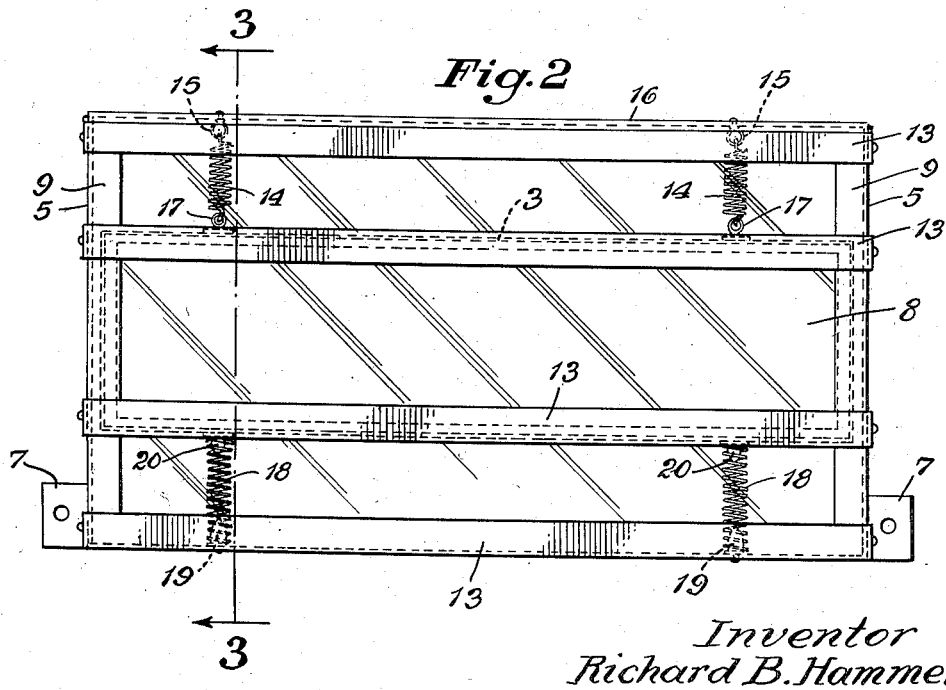
Fig. 2 is a rear elevation of the device by itself on an enlarged scale.

In general the device comprises a reflective or reflector member and a movable mounting therefor and a transparent or translucent piece situated so that light from an approaching vehicle passes through it to the reflective member. The device further comprises opaque or substantially opaque members in the path of entering and reflected light, which act as barrier members that prevent entering light from impinging on the reflector member.

In the particular form here shown the reflector member may comprise a mirror having a glass or transparent portion 1 and a reflective backing 2 on it. The backing 2 is in effect a reflecting surface. This may be a conventional mirror. Its surface may be plane or it may be irregular so as to produce a more or less prismatic affect, if desired. The invention is not limited to any particular form of mirror or of reflecting means. This reflector member is preferably mounted for movement. As shown, it may comprise a frame 3 which is mounted to move or slide generally vertically in the form shown in tracks 4, 4 fixed to the inside of a housing which comprises side portions 5 and a back 6, to which brackets 7 may be fastened for attachment to an automotive vehicle. The back portion 6 will generally be opaque. Positioned in the path of entering light is a translucent or transparent window portion 8 which may be of glass, plastic or any suitable material through which light may pass. It is positioned to be supported by the frame member 5 and held in place by inwardly extending flanges 9 which extend preferably about the opening of the frame 5. The member 8 is removably held in place within the frame structure as a whole by the flange portion 10 of a member 11 which is adjustably and removably within the frame structure, being held in place by bolts 12 or otherwise.

Extending across the rear of the frame structure in the direction of entering light is a plurality of opaque or substantially opaque barrier members 13. These members may be separately formed and positioned in place as shown or they may merely be painted upon or otherwise formed on the outward face of the member 8. It is sufficient for the purposes of the invention that opaque areas or zones be provided in the path of entering and reflected light and that there be also transparent or translucent areas through which light may freely pass to and from the reflector member.

The reflector member is mounted to move in the tracks 6 and it is spring supported. One or more springs or yielding suspending means 14 may be positioned above the member 1 and, as shown, these springs engage rings 15 fixed in the top cover 16 of the frame and they engage rings 17 secured to the reflective member 1 or to its frame 3.

One or more additional springs or yielding suspending means 18 may be positioned beneath the reflector member and they are positioned by lugs 19 fixed to the frame structure 5 and also by lugs 20 fixed to the reflector member or to its frame. Thus, by means of springs the reflector member is mounted to move. The particular type of springs is unimportant as the device may be carried by any sort of springs, fluid or mechanical, or of any other nature. When the structure upon which the warning device is located is stationary, the mirror will be stationary and although it will reflect light, it will not give the impression of motion, nor the impression of the changing or fluctuating light. When, however, the vehicle or other device upon which the invention is mounted moves, its vibration and its up-and-down movement caused by unevenness of the road's surface will affect the mirror which will then move, bouncing in effect up and down or moving up and down as a result of the vehicle's motion and this movement is permitted by the springs.

If the mirror 1, 2 were located in the open or behind a transparent sheet, its movement would not produce the desired affect. It is necessary that there be interposed between the mirror and the reflected light zones of contrast. These may be opaque zones. They might be fixed bars or strips and the translucent member 8 might be omitted. The member 8 is primarily convenient as a part of the enclosure which keeps dust and moisture away from the mirror surface and away from its supporting and suspending means. Since the members 13 are either opaque or of the substantially different light-transmitting capacity from the surface 8, and the members 13 constitute zones of contrasting transparency or translucency, and this contrasting effect would be produced even if the member 8 were omitted because the members 13 are of different light-transmitting capacity from the air, it would be unimportant if the member 8 were omitted.

When the member 1 is stationary it reflects light through the portion of the member 8 which is transparent or translucent and it acts as a mirror of fixed size. When however, the vehicle is in motion and it rises and falls, its affect would be modified. If it rises substantially or falls substantially from the position shown in Fig. 3, a portion of the mirror will show above or below one or another of the intermediate opaque zones 13. Thus the effect of an additional light above or below one of these members will be produced. If the movement of the mirror is sufficient in the upper direction, for example, the lower edge of the mirror will clear the top edge of the intermediate lower zone 13 and since the frame back 6 is not reflective, the effect will be that the area of reflection between the two intermediate members 13 will be reduced at the same time that the reflecting surface area appears above the upper intermediate member 13. In a similar fashion, if the movement of the mirror is sufficiently low, it will appear well below the lower intermediate member 13 while its upper edge will fall well below the lower edge of the upper intermediate member 13, and thus as the mirror moves up and down it produces the effect of a flickering or moving light which changes in size and in location and which may give the impression of two or more lights or a single light. The generally parallel movement between the barrier member or members and the reflector results, in effect, in alternate bursts of reflected light as the reflecting surface appears, disappears, and reappears from behind the non-reflective surface of the generally opaque barrier member.

The device may be mounted on any part of any vehicle so long as it is in position to reflect the lights from an approaching vehicle. It might be at the rear or at the side. It might be mounted on a railroad freight car. The mirror itself might be stationary and opaque zones or zones of contrasting translucency or transparency might be moved in front of it and the purpose of the invention will be accomplished, therefore, if there is a relative range of movement between the reflective member and the interposed zones of varying or contrasting translucence and transparency positioned in the path of entering and of reflected light.

Although I have shown an operative form of my device, the invention is not limited to the particular details shown. Many changes may be made in the form, shape and arrangement of parts without departing from the spirit of the invention.

I claim:

1. A self-actuated vehicular warning device adapted to be operated by the movement of the vehicle on which it is mounted including a support structure adapted to be secured to a vehicle, a reflector member having a reflecting surface, at least one barrier member having a non-reflective surface overlying a portion of the reflecting surface, yielding means for suspending one of the members from the support structure, said yielding means permitting a range of generally parallel movement of one member with respect to the other and to the support structure in response to vehicle induced movement of the support structure, means for securing the other of said members to the support structure, said non-reflective surface overlying a portion of the reflecting surface at a position within the range of movement of the members permitted by the yielding suspending means to thereby furnish alternate bursts of reflected light emanating from that portion of the reflector which appears from behind the non-reflective surface.

2. The warning device of claim 1 in which the barrier member overlies an edge of the reflector member in a stationary condition of the warning device.

3. A self-actuated vehicular warning device adapted to be operated by the movement of the vehicle on which it is mounted including a support structure adapted to be secured to a vehicle, a reflector having a reflecting surface, yielding means for suspending the reflector from the support structure, said yielding means permitting a range of movement of the reflector with respect to the support structure in response to vehicle induced movement of the support structure, and a barrier member having a non-reflective surface overlying a portion of the reflecting surface at a position within the range of movement of the reflector permitted by the yielding suspending means to thereby furnish alternate bursts of reflected light emanating from that portion of the reflector which appears from behind the non-reflective surface, said yielding means positioning the reflector for generally parallel movement with respect to the barrier member.

4. The warning device of claim 3 further characterized in that the barrier member is contoured to follow the line of the edge of the reflector when the reflector is stationary, said barrier member having only a small overlap on either side of the line of the edge of the reflector.

References Cited in the file of this patent

UNITED STATES PATENTS

| 1,138,737 | Dunham | May 11, 1915 |
| 1,674,565 | Peterson | June 19, 1928 |
| 2,115,271 | La Londe | Apr. 26, 1938 |
| 2,215,550 | Gray | Sept. 24, 1940 |
| 2,546,227 | Leonard | Mar. 27, 1951 |

FOREIGN PATENTS

| 8,797 | Great Britain | of 1905 |
| 26,697 | Great Britain | of 1910 |
| 604,741 | France | Feb. 1, 1926 |
| 752,234 | France | July 10, 1933 |